United States Patent
Ge et al.

(10) Patent No.: US 8,866,409 B2
(45) Date of Patent: Oct. 21, 2014

(54) CONSTANT-CURRENT LED DRIVER CIRCUIT AND OUTPUT VOLTAGE ADJUSTABLE CIRCUIT AND METHOD THEREOF

(75) Inventors: Liang'an Ge, Zhejiang (CN); Xiaoli Yao, Zhejiang (CN); Guichao Hua, Zhejiang (CN); Lijun Ren, Zhejiang (CN)

(73) Assignee: Inventronics (Hangzhou), Inc., Hangzhou, Zhejiang (CN)

( * ) Notice: Subject to any disclaimer, the term of this patent is extended or adjusted under 35 U.S.C. 154(b) by 0 days.

(21) Appl. No.: 13/700,352

(22) PCT Filed: Nov. 10, 2010

(86) PCT No.: PCT/CN2010/078612
§ 371 (c)(1),
(2), (4) Date: Nov. 27, 2012

(87) PCT Pub. No.: WO2011/150631
PCT Pub. Date: Dec. 8, 2011

(65) Prior Publication Data
US 2013/0088169 A1    Apr. 11, 2013

(30) Foreign Application Priority Data
May 31, 2010   (CN) .......................... 2010 1 0188568

(51) Int. Cl.
*G05F 1/00*    (2006.01)

(52) U.S. Cl.
USPC ......................................................... 315/297

(58) Field of Classification Search
USPC .................................. 315/297, 294, 302, 312
See application file for complete search history.

(56) References Cited

U.S. PATENT DOCUMENTS 8,169,156 B2 * 5/2012 Hsu et al. ....................... 315/291
2008/0054815 A1 * 3/2008 Kotikalapoodi et al. ..... 315/192
(Continued)

FOREIGN PATENT DOCUMENTS

CN    101605413 A    12/2009
CN    201365198 Y    12/2009
(Continued)

OTHER PUBLICATIONS

International Search report (in Chinese with English translation) and Written Opinion (in Chinese) for PCT/CN2010/078612, mailed Mar. 10, 2011; ISA/CN.

*Primary Examiner* — Thienvu Tran
(74) *Attorney, Agent, or Firm* — Harness, Dickey & Pierce, P.L.C.

(57) ABSTRACT

A constant-current Light Emitting Diode (LED) driver circuit is provided, and the circuit includes: an output voltage adjustable circuit and at least one path of LED load, wherein the output voltage adjustable circuit comprises: a switch converting main circuit, an output characteristic parameter sampling circuit, and an output voltage controller. The output voltage controller is used to adjust the output voltage of the switch converting main circuit according to the variation relationship between the sampling signal output by the output characteristic parameter sampling circuit and the output voltage, determine the adjustive direction of the output voltage magnitude of the switch converting main circuit according to the change of the sampling signal, adjust the magnitude of the output voltage of the switch converting main circuit according to the preset step, and finally make the output voltage equal to the voltage of one path of LED load with the highest voltage or the difference between the output voltage and the voltage of one path of LED load voltage with the highest voltage within the predetermined range. The present solution implements reducing the connection complexity and power dissipation on the base of controlling the multi-path constant-current LED.

20 Claims, 5 Drawing Sheets

(56) References Cited

U.S. PATENT DOCUMENTS

| | | | |
|---|---|---|---|
| 2009/0187925 A1* | 7/2009 | Hu et al. | 719/327 |
| 2009/0273288 A1* | 11/2009 | Zhao et al. | 315/185 R |
| 2010/0148679 A1* | 6/2010 | Chen et al. | 315/185 R |
| 2010/0148697 A1* | 6/2010 | Bayat et al. | 315/294 |
| 2011/0037410 A1* | 2/2011 | Hsu et al. | 315/294 |
| 2011/0043138 A1* | 2/2011 | Hsu et al. | 315/297 |

FOREIGN PATENT DOCUMENTS

| | | |
|---|---|---|
| CN | 101631410 A | 1/2010 |
| CN | 101668369 A | 3/2010 |
| CN | 201491338 U | 5/2010 |
| CN | 201708995 U | 1/2011 |
| CN | 102264173 B | 11/2013 |
| JP | 2008130377 A | 6/2008 |

* cited by examiner

CONSTANT-CURRENT LED DRIVER CIRCUIT AND OUTPUT VOLTAGE ADJUSTABLE CIRCUIT AND METHOD THEREOF

CROSS-REFERENCE TO RELATED APPLICATIONS

This present application is the national phase of International Application No. PCT/CN2010/078612, titled "CONSTANT-CURRENT LED DRIVER CIRCUIT AND OUTPUT VOLTAGE ADJUSTABLE CIRCUIT AND METHOD THEREOF", filed on Nov. 10, 2010, which claims the benefit of Chinese patent application No. 201010188568.2, titled "CONSTANT-CURRENT LED DRIVER CIRCUIT AND OUTPUT VOLTAGE ADJUSTABLE CIRCUIT AND METHOD THEREOF" and filed with the State Intellectual Property Office on May 31, 2010, both of which are hereby incorporated by reference in their entirety.

FIELD OF THE INVENTION

The invention relates to the filed of LED (Light Emitting Diode) driving technology, and in particular to a constant-current LED driving circuit, an output voltage adjustable circuit and a method thereof.

BACKGROUND OF THE INVENTION

LED is a solid state semiconductor device which can directly convert electricity into light. The intrinsic characteristic of the LED decides that it is the ideal substitute for traditional light source, and therefore it has broad applications.

In addition to meeting safety requirements, the LED driving circuit should has two basic functions: firstly, it should maintain the constant-current characteristic as far as possible, especially when a change of ±15% occurs in the power supply voltage, it should be able to ensure that the change in the output current is within ±10%; secondly, the driving circuit itself should maintain a lower power consumption, so as to ensure that the LED system efficiency maintains at a high level.

In the prior art, as for the application of the multi-path constant-current LED driver, there are two common solutions:

1. a constant-voltage power supply together with multiple non-isolated DC/DC constant-current control circuits, such as, Buck circuits, i.e. Buck type conversion circuits.

As shown in FIG. 1, the output of the constant-voltage power supply is used as the input for each of the multiple constant-current circuits, and constant-current control is performed for each DC/DC conversion circuit independently, therefore constant-current driving of multiple LED branches may be easily ensured and meanwhile the efficiency of the driver is higher. When respective DC/DC constant-current control circuits together with respective LED branches constitute multiple loads of the constant-voltage power supply, the constant-voltage power supply in the front stage needs only two output wires to be connected to the multiple loads in the post stage, which means a simple wiring.

However, this solution has the disadvantage that the multi-path DC/DC constant-current control converter circuit is complicated and has high cost.

2. Output voltage adjustable voltage source together with multiple current-limiting circuits for circuitry adjustment.

As shown in FIG. 2, linear adjustment is performed by regulating MOS transistors Q1, Q2, ..., Qn to achieve the constant-current driving of multiple LED branches. An output voltage adjustable voltage source 201 in the front stage samples a minimum drain voltage of the regulating transistor in the multiple linear adjustment current-limiting circuits 203 in the post-stage through a minimum value sampling circuit 202, and performs feedback control based on the minimum value by means of an output voltage control circuit 204, maintaining the minimum value at a low voltage value, so that the output voltage Vo of the output voltage adjustable voltage source 201 is always slightly higher than the voltage of one of the multiple branches which has the highest voltage, and the power consumption of the linear regulator circuit 203 is always close to the minimum value while ensuring that each LED load is driven at a current-limiting point.

In such a solution, the linear adjustment current-limiting circuit in each branch has low cost, and may achieve relatively high efficiency when the voltage difference between the multiple branches of LEDs is smaller. However, the solution has the following disadvantages: the output voltage control circuit 204 of the output voltage adjustable voltage source 201 in the front stage needs to sample the voltage in the post-stage circuit formed by the branch of LED(s) and the linear adjustment current-limiting circuit 203, therefore the wiring between the front-stage output voltage adjustable voltage source 201 and the post-stage circuits is complicated. Moreover, in this solution, for the convenience of the output voltage adjustable voltage source to perform the voltage sampling from the post-stage circuit, the linear adjustment current-limiting circuit 203 is typically required to be arranged inside the driver together with the output voltage adjustable voltage source 201, therefore the heat generation of the driver is tremendous for the reason that the consumption of the regulating transistor is large when the voltage difference between the multiple branches of LED(s) is large, which affects the life time and reliability of the driver; when a open-circuit failure occurs in a LED branch, the voltage on the drain of the linear regulating transistor in this LED branch is zero, therefore additional open-circuit protection is required in order to maintain the normal operations of other LED branches.

SUMMARY OF THE INVENTION

In view of the above technical problems in the prior art, a constant-current LED driving circuit, an output voltage adjustable circuit and a method thereof are provided in embodiments of the present invention, which can reduce wiring complexity and power consumption while achieving constant-current control for LED.

Embodiments of the invention provide the following technical solutions.

A constant-current LED driving circuit including an output voltage adjustable circuit and at least one LED load, in which each LED load includes one or more LEDs and a current-limiting circuit connected in series with the one or more LEDs, the current-limiting circuit is adapted to limit a maximum current in the one or more LEDs connected with the current-limiting circuit, the LED load is connected with the output voltage adjustable circuit via two terminals, and the LED loads are independent from each other;

the output voltage adjustable circuit includes:

a switch conversion main circuit, for connecting a power supply and outputting an adjustable voltage to the at least one LED load;

an output characteristic parameter sampling circuit for sampling an output characteristic parameter of the switch conversion main circuit and outputting a sampled signal of the characteristic parameter; and an output voltage controller for adjusting an output voltage of the switch conversion main circuit according to a variation relationship between the sampled signal and the output voltage, where adjusting the output voltage of the switch conversion main circuit comprises determining a direction for adjusting the output voltage of the switch conversion main circuit according to a variation in the sampled signal and adjusting the output voltage of the switch conversion main circuit at a preset step, so that finally the output voltage is equal to a voltage of one LED load which has the highest voltage or the output voltage has a difference within a predetermined range as compared to the voltage of the LED load which has the highest voltage.

An output voltage adjustable circuit, including:

a switch conversion main circuit for connecting a power supply and outputting an adjustable voltage;

an output characteristic parameter sampling circuit for sampling an output characteristic parameter of the switch conversion main circuit and outputting a sampled signal of the characteristic parameter; and an output voltage controller for adjusting an output voltage of the switch conversion main circuit according to a variation relationship between the sampled signal and the output voltage, wherein adjusting the output voltage of the switch conversion main circuit comprises determining a direction for adjusting the output voltage of the switch conversion main circuit according to a variation in the sampled signal and adjusting the output voltage of the switch conversion main circuit at a preset step, so that finally the output voltage is equal to a voltage of a branch which has the highest load voltage in post-stage loads or the output voltage has a difference within a predetermined range as compared to the voltage of the branch which has the highest load voltage in the post-stage loads.

An output voltage adjustable method for controlling an output voltage of an output voltage adjustable circuit, where the output voltage adjustable circuit needs only two wires to be supplies to one or more LED loads connected in parallel, each LED load includes one or more LEDs and a current-limiting circuit connected in series with the one or more LEDs, and the method includes:

determining a direction for adjusting the output voltage of the output voltage adjustable circuit according to a variation relationship between a characteristic parameter sampled signal and the output voltage;

adjusting the output voltage of the output voltage adjustable circuit at a preset step, according to the direction for adjusting the output voltage; and adjusting the output voltage by performing the above steps once or repeatedly, so that the output voltage is equal to a voltage of one LED load which has the highest voltage or the output voltage has a difference within a predetermined range as compared to the voltage of one LED load which has the highest voltage.

In the constant-current LED driving circuit according to the embodiment of the invention, an adjustable output voltage is output from an output voltage adjustable circuit in the front stage; and in practice, without sampling the signal in the LED loads in the post stage, the output voltage is adjusted automatically to be equal to or close to the voltage of one LED load which has the highest voltage, i.e., the difference between the output voltage and the voltage of the LED load which has the highest voltage is within a predetermined range. Thus, the current in each LED load is equal to or close to the current set by the current-limiting circuit in the LED load; and when any LED load is in an open-circuit state, no additional open-circuit protecting or detecting circuit is required for that the output voltage adjustable circuit can automatically adjust the output voltage, so that each of the remaining LED loads that are in a normal-connection state can be driven at a constant current that is equal to or close to the current-limiting point. In the case that some of the LEDs are in an open-circuit state, when the LEDs are re-connected in a plug-and-play manner, the output voltage adjustable circuit can adjust the output voltage automatically, so that each of the LED loads that are in a normal connection state can be driven at a constant current that is equal to or close to the current-limiting point. Linear regulator circuit with low cost may be employed for the current limiting circuit, which has approximately the minimum power consumption while ensuring the constant-current control for each branch. In addition, the current-limiting circuit can be arranged on a base plate of the LED load of the branch where the current-limiting circuit lies, thus improving the heat dissipation ability. When the multiple loads of the output voltage adjustable circuit are composed of respective current-limiting circuits and respective LEDs connected in series with the current-limiting circuits, the output voltage adjustable circuit in the front stage only needs two wires to be connected to the multiple loads in the post-stage, therefore the wiring is simple, and no additional connecting wires are needed among the multiple loads.

Except for the LED load, the embodiment of the invention is also applicable to other DC load suitable for constant-current control.

DETAILED DESCRIPTION OF THE INVENTION

Figure 1:
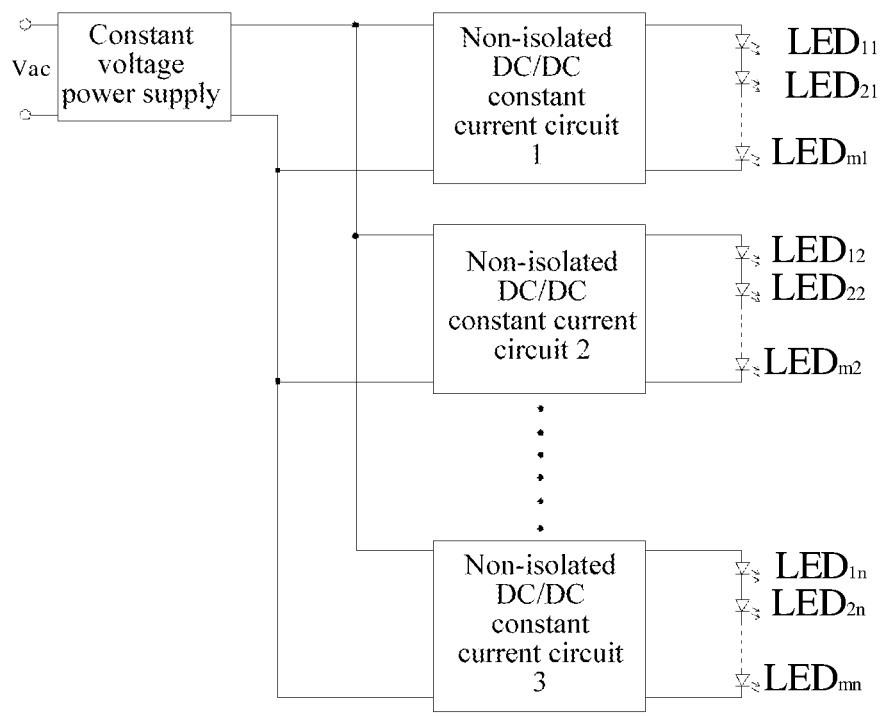
FIG. 1 is a schematic diagram of a multi-path constant-current LED control driver in the prior art.
Figure 2:
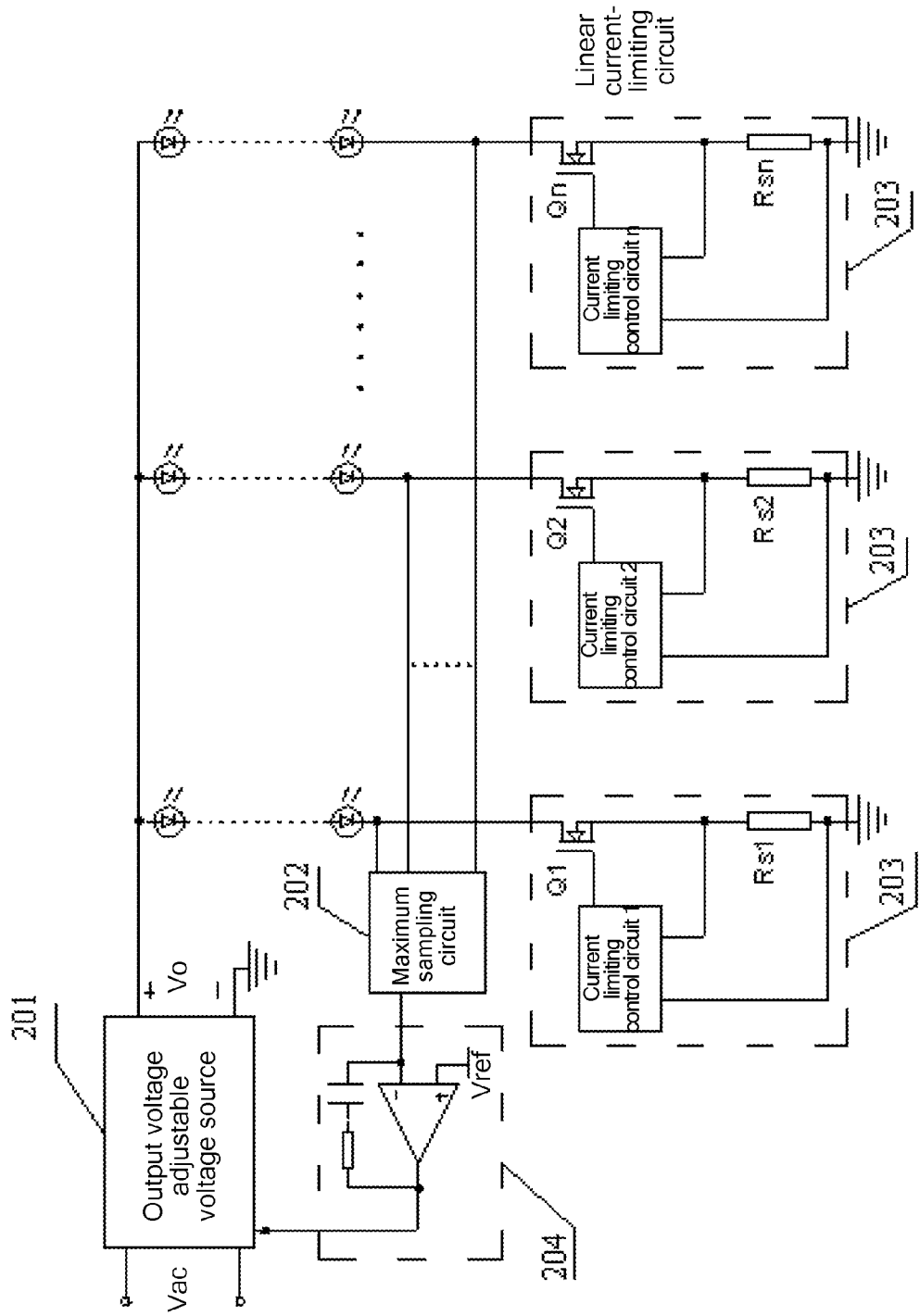
FIG. 2 is a schematic diagram of another multi-path constant-current LED control driver in the prior art.

For better understanding of the solutions in the embodiments of the invention by those skilled in the art, the solutions of the invention will be further described in detail hereinafter in conjunction with drawings and embodiments.

An embodiment of the invention provides an output voltage adjustable circuit, which includes:

a switch conversion main circuit for connecting a power supply and outputting an adjustable output voltage;

an output characteristic parameter sampling circuit for sampling an output characteristic parameter of the switch conversion main circuit and outputting a sampled signal of the output characteristic parameter; and an output voltage controller for adjusting an output voltage of the switch conversion main circuit according to a variation relationship between the sampled signal and the output voltage, wherein adjusting the output voltage of the switch conversion main circuit comprises determining a direction for adjusting the output voltage of the switch conversion main circuit according to a variation in the sampled signal and adjusting the output voltage of the switch conversion main circuit at a preset step, so that finally the output voltage is equal to a voltage of a branch which has the highest load voltage in post-stage loads or the output voltage has a difference within a predetermined range as compared to the voltage of the branch which has the highest load voltage in the post-stage loads. The specific process of adjusting the output voltage of the switch conversion main circuit by the output voltage controller will be described in detail hereinafter.

It should be noted that the switch conversion main circuit may be an AC-DC converter or a DC-DC converter.

The output voltage adjustable circuit is applicable for constant-current driving of one or more LED loads and also is applicable for the driving of other DC loads that need constant-current control.

Accordingly, the embodiment of the invention further provides a constant-current LED driving circuit which includes the output voltage adjustable circuit described above and at least one LED load, with each LED load including one or more LEDs and a current-limiting circuit connected in series with the one or more LEDs, and the current-limiting circuit being used to limit a maximum current in the one or more LEDs connected with the current-limiting circuit, where the output voltage adjustable circuit is provided with two terminals, each LED load is connected with the output voltage adjustable circuit via the two terminals, and the LED loads are independent from each other. In the constant-current LED driving circuit, an adjustable output voltage is output through the output voltage adjustable circuit in the front-stage, and the output voltage is adjusted to be equal to or close to the voltage of one LED load which has the highest voltage, thus the current in each LED load in the post-stage is equal to or close to the current set by the current-limiting circuit connected in series with the LED load. The current-limiting circuit may be a constant-current diode or other devices with a constant-current function which can limit the maximum current flowing through itself.

Figure 3:
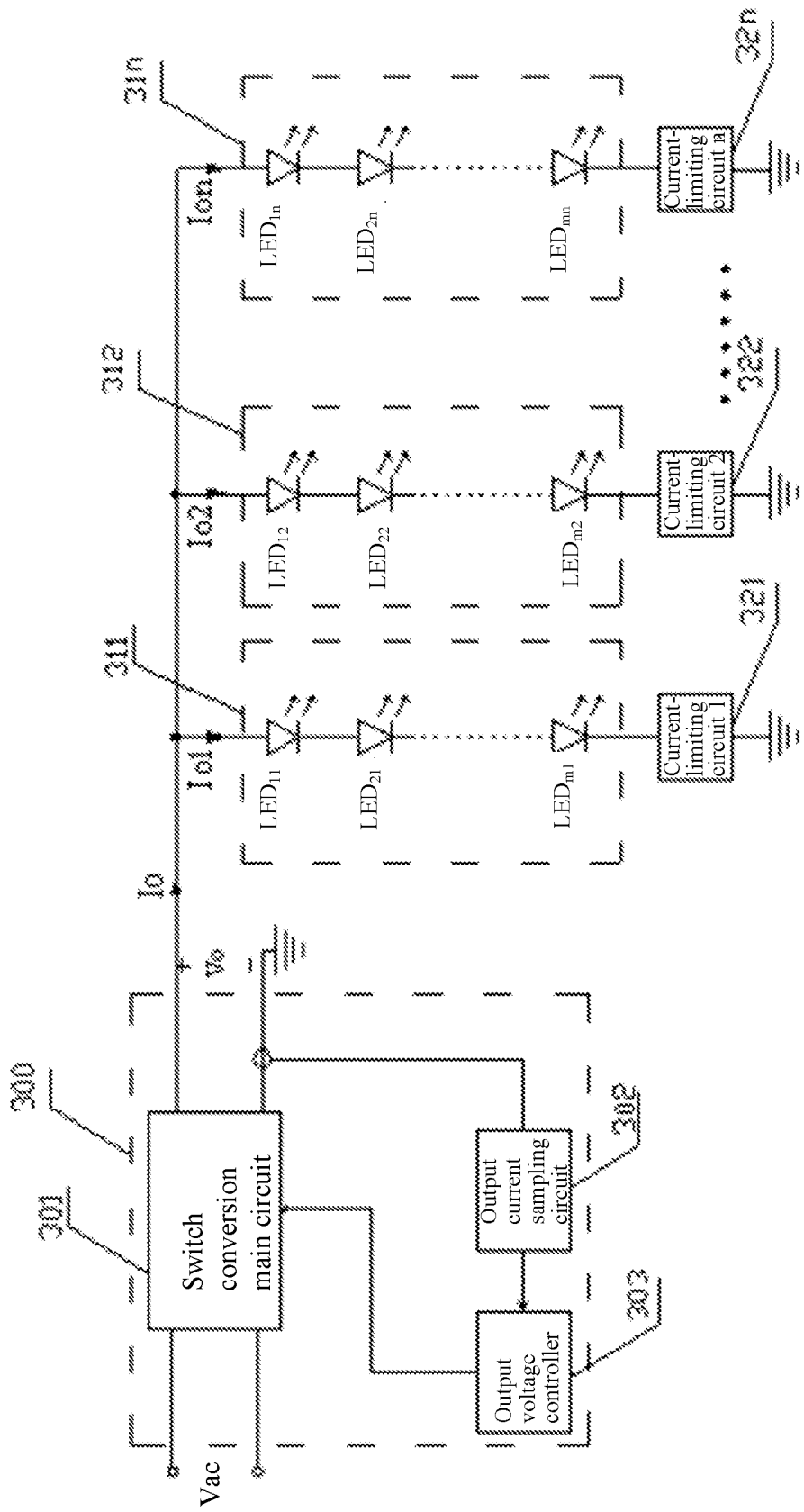
FIG. 3 is a schematic structural diagram of a constant-current LED driving circuit according to an embodiment of the invention.

FIG. 3 is a schematic structural diagram of a constant-current LED driving circuit according to an embodiment of the invention.

In the embodiment, the constant-current LED driving circuit includes: at least one LED load and an output voltage adjustable circuit 300 for supplying power to the at least one LED load.

In FIG. 3, it shows the case that there are multiple LED loads. These LED loads are connected in parallel, and between any two LED loads there is no additional wiring except for the connection with the output voltage adjustable circuit 300 in the front stage. Each LED load includes one or more LEDs connected in series, such as 311, 312 . . . 31n shown in FIG. 3, and a current-limiting circuit connected in series with the one or more LEDs, such as the current-limiting circuits 321, 322 . . . 32n shown in FIG. 3. The current-limiting circuit is used to limit a maximum current in the LED(s) connected with the current-limiting circuit.

The input terminals of the output voltage adjustable circuit 300 are used to connect a power supply, and the output terminals of the output voltage adjustable circuit 300 are connected in parallel with multiple LED loads and automatically output an adjustable output voltage.

As seen from FIG. 3, in the constant-current LED driving circuit according to the embodiment of the invention, and the output voltage adjustable circuit 300 needs only two output wires to be connected with the multiple LED loads in the post stage, the wiring is simple, and no additional connecting wires are needed among the multiple LED loads.

In the embodiment, the output voltage adjustable circuit 300 includes:

a switch conversion main circuit 301, for connecting a power supply and outputting an adjustable voltage;

an output characteristic parameter sampling circuit 302, for sampling an output characteristic parameter of the switch conversion main circuit 301 and outputting a sampled signal;

an output voltage controller 303, for adjusting the output voltage of the switch conversion main circuit 301 according to the sampled signal output from the output characteristic parameter sampling circuit 302, so that the output voltage of the output voltage adjustable circuit 300 is equal to or close to the voltage of one LED load which has the highest voltage, for example the output voltage has a difference within a predetermined range as compared to the voltage of one LED load which has the highest voltage, and thus the current in each LED load is equal to or close to the current set by the limiting-current circuit connected in series in the LED load.

It should be noted that the switch conversion main circuit 301 may be an AC-DC converter or a DC-DC converter. That is to say, the input voltage of the switch conversion main circuit 301 may be an AC voltage or a DC voltage. In FIG. 3 a case that the input voltage is an AC voltage is shown by Vac.

In addition, according to an embodiment of the invention, the output characteristic parameter of the output characteristic parameter sampling circuit includes at least an output current; the output characteristic parameter sampling circuit can be an output current sampling circuit for sampling the current output from the switch conversion main circuit and outputting a sampled signal of the current. The following explanation is made by taking the output current as the output characteristic parameter.

The operation process of the constant-current LED driving circuit according to the embodiment of the invention will be further described in detail hereinafter in conjunction with FIG. 3.

In FIG. 3, linear regulator circuit with low cost may be adopted as the current-limiting circuit in the LED load, the current limited by the current-limiting circuit in different branches may be the same or different.

The output voltage controller 303 determines a direction for adjusting the output voltage of the switch conversion main circuit 301 according to the change in the sampled signal, and adjusts the output voltage of the switch conversion main circuit 301 in accordance at a preset step (for example, the step is 10 mV, and if it is determined according to the sampled signal that the output voltage should be increased, the output voltage should be increased by 10 mV each time during the adjustment), so that finally the output voltage is equal to the voltage of one LED load which has the highest voltage or the difference between the output voltage and the voltage of one LED load which has the highest voltage is within a predetermined range (for example, it is assumed that the difference between the final output voltage and the voltage of one LED load which has the highest voltage does not exceed 500 mV, i.e. the predetermined range is [−500 mV, +500 mV]).

It should be noted that the step may be fixed or variable.

The output voltage controller in the embodiment of the invention is specifically configured to adjust the output voltage of the switch conversion main circuit in a digital control manner according to the sampled signal output from the output characteristic parameter sampling circuit. The process for adjusting the output voltage of the switch conversion main circuit in a digital control manner by the output voltage controller includes:

(1) controlling, by the output voltage controller, the output voltage adjustable circuit to increase the output voltage of the output voltage adjustable circuit at a set step on the basis of the previous output voltage;

(2) detecting the output current; performing step (1) if the output current is increased as the output voltage is increased; performing step (3) if the output current remains unchanged;

(3) controlling, by the output voltage controller, the output voltage adjustable circuit to decrease the output voltage of the output voltage adjustable circuit at a set step on the basis of the previous output voltage; and (4) detecting the output current; performing step (3) if the output current remains unchanged; performing step (1) if the output current is decreased as the output voltage is decreased.

In the present embodiment, the specific adjustment process is as follows:

Preferably, when the switch conversion main circuit 301 is controlled by the output voltage controller 303 to increase the output voltage Vo of the switch conversion main circuit 301 at a set step on the basis of the previous output voltage, if it is detected that the output current Io of the switch conversion main circuit 301 is accordingly increased, which means that not all the current-limiting circuits in the multiple LED loads are operating in the current-limiting state, the switch conversion main circuit 301 should keep to be adjusted towards a direction of increasing the output voltage; and when the switch conversion main circuit 301 increases the output voltage Vo at a set step on the basis of the previous output voltage, if it is detected that the output current Io of the switch conversion main circuit 301 remains unchanged, which means that all the current-limiting circuits in the multiple LED loads are operating in the current-limiting state, the switch conversion main circuit 301 should be adjusted towards a direction of decreasing the output voltage. When the switch conversion main circuit 301 decreases the output voltage Vo at a set step on the basis of the previous output voltage, if it is detected that the output current Io of the switch conversion main circuit 301 remains unchanged, which means that all the current-limiting circuits in the multiple LED loads are operating in the current-limiting state, the switch conversion main circuit 301 should keep to be adjusted towards a direction of decreasing the output voltage; and when the switch conversion main circuit 301 decreases the output voltage Vo at a set step on the basis of the previous output voltage, if it is detected that the output current Io is decreased as the output voltage Vo is decreased, which means that not all the current-limiting circuits in the multiple LED loads are operating in the current-limiting state, the switch conversion main circuit 301 should be adjusted towards a direction for increasing the output voltage.

In accordance with the above-mentioned adjustment process, the output voltage of the switch conversion main circuit 300 is finally adjusted be equal or close to the voltage of one LED load which has the highest voltage, for example the difference between the output voltage of the switch conversion main circuit 300 and the voltage of one LED load which has the highest voltage is within a predetermined range, and thus the current in each LED load is equal to or close to the current set by the current-limiting circuit in the LED load.

Of course, the embodiment of the invention is not limited to the above specific way of adjusting the output voltage, and other ways are also possible, as long as the final output voltage is equal to the voltage of one LED load which has the highest voltage or the difference between the final output voltage and the voltage of one LED load which has the highest voltage is within a predetermined range.

It should be noted that in the embodiment of the invention, the current-limiting circuit can be arranged in a base plate of the LED(s) connected in series with the current-limiting circuit, for facilitating heat dissipation. Furthermore, the current-limiting circuit can be a linear regulator circuit with low cost. In this way, the current in each LED load may be rendered to be equal to or close to the current value set by the current-limiting circuit, so that the power consumption of the linear regulator circuit is minimum or close to minimum.

FIG. 3 shows a case of multiple LED loads. It should be noted that as for the case of only one LED load, the process that the output voltage controller 303 adjusts the output voltage according to the change in the sampled signal is similar to the above description, which will not be described in detail herein.

Figure 4:
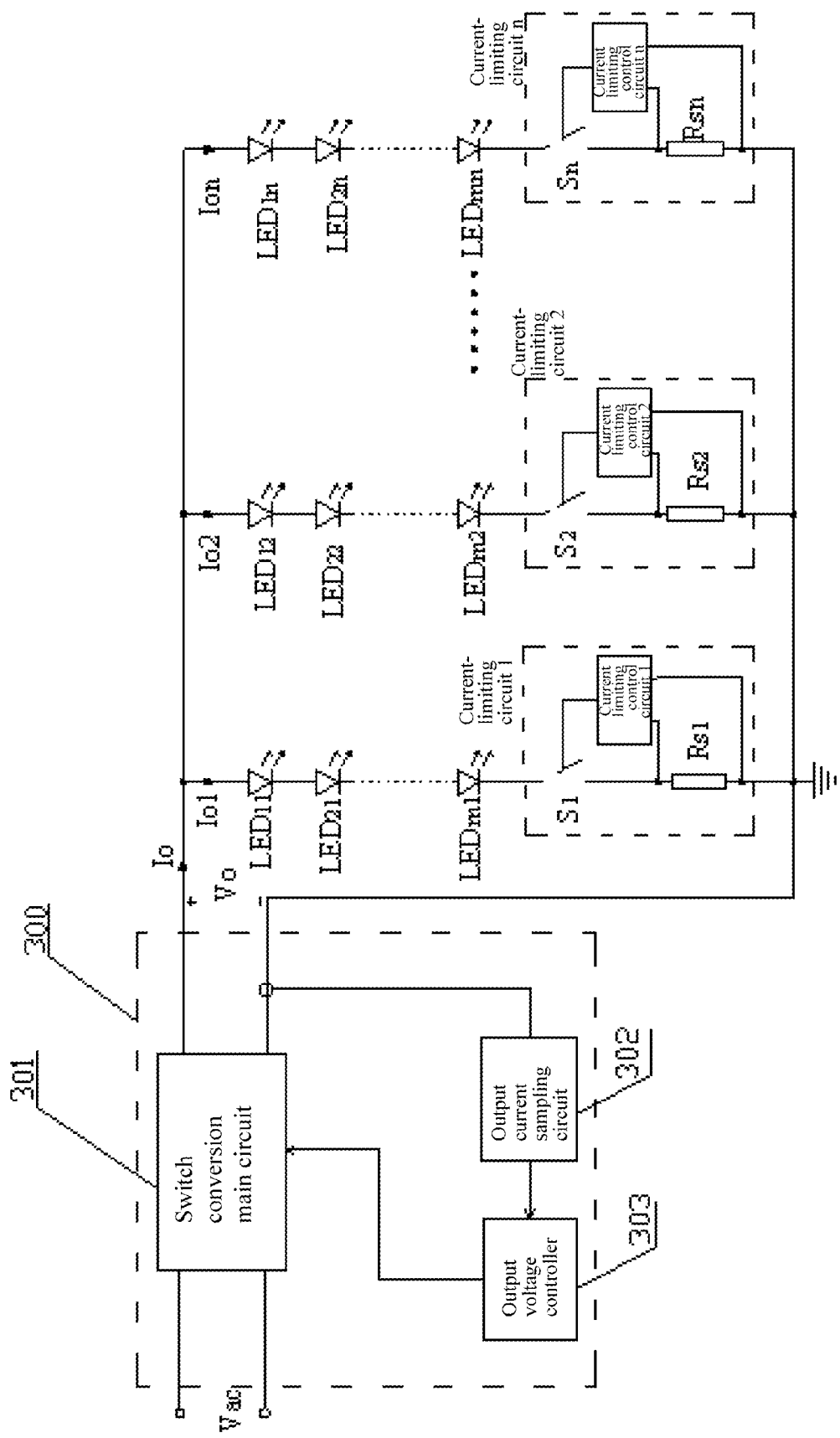
FIG. 4 is a schematic diagram showing practical application of a constant-current LED driving circuit according to an embodiment of the invention.

FIG. 4 is a schematic diagram showing practical application of the constant-current LED driving circuit according to the embodiment of the invention.

In FIG. 4, the output characteristic parameter sampling circuit 302 in the embodiment of FIG. 3 is specifically embodied as an output current sampling circuit 402. The input terminals of the switch conversion main circuit 301 are connected to an input voltage Vac, the output voltage at the output terminals of the switch conversion main circuit 301 is Vo, and the output current is Io. The input signal of the output current sampling circuit 402 comes from the sampled signal of the output current Io, the output terminal of the output current sampling circuit 402 is connected to the input terminal of the output voltage controller 303, and the output terminal of the output voltage controller 303 is connected with the switch conversion main circuit 301. There are n LED loads, and each LED load includes m LEDs and one current-limiting circuit. Each current-limiting circuit includes a current-limiting control circuit, a regulating transistor Sr and a branch load current sampling resistor Rsr (where r=1, 2, . . . , n). The regulating transistor Sr is connected in series with the branch load current sampling resistor Rsr through a first terminal and a second terminal, and is connected in series with the LEDs in the present branch, two input terminals of the current-limiting control circuit are connected with two terminals of the branch load current sampling resistor Rsr respectively, and the output terminal of the current-limiting control circuit is connected with a third terminal of the regulating transistor Sr. As shown in FIG. 4, there are m LEDs connected in series in each LED load, the negative terminal of the series-connected branch is connected to the first terminal of the regulating transistor Sr, the second terminal of the regulating transistor Sr is connected with one terminal of the resistor Rsr, the other terminal of the resistor Rsr is connected to ground, the input terminals of the current-limiting control circuit is connected with the two terminals of the resistor Rsr, and the output terminal of the current-limiting control circuit is connected with the third terminal of the regulating transistor Sr.

The current-limiting circuit can be a linear regulator circuit, in which the regulating transistor operates in a linear state, and the load current is DC current. The sampling resistor Rsr samples the current signal of the load in the present branch; the current-limiting control circuit compares the current signal with a reference signal preset in the current-limiting control circuit, then outputs a corresponding control signal to the control terminal of the regulating transistor Sr, i.e. the third terminal of the regulating transistor Sr described above, so as to control the current in the present branch to not exceed the preset current value by changing the turn-on resistance of the regulating transistor Sr.

The current-limiting circuit can also be a PWM (Pulse Width Modulation) chopping current-limiting circuit, in which the regulating transistor operates in a switch state or a fully turn-on state, and the load current can be PWM current or DC current. The sampling resistor Rsr is used to sample the current signal of the branch, and the current signal may be a PWM signal or a DC signal; the current-limiting control circuit converts the current signal into an average value signal, compares the average value signal with a reference signal preset in the current-limiting control circuit, and then outputs a corresponding control signal to the control terminal of the regulating transistor Sr, so as to control the current in the present branch to not exceed the preset current value by changing the turn-on duty ratio of the regulating transistor Sr.

In addition, an embodiment of the invention also provides an output voltage adjustable method which is suitable for controlling the output voltage of an output voltage adjustable circuit, where the output voltage adjustable circuit needs only two wires to be supplied to one or more LED loads connected in parallel, each LED load includes one or more LEDs and a current-limiting circuit connected in series with the one or more LEDs.

The output voltage adjustable method includes:

determining a direction for adjusting the output voltage of the output voltage adjustable circuit according to the variation relationship between a characteristic parameter sampled signal and the output voltage;

adjusting the output voltage of the output voltage adjustable circuit in accordance at a preset step, according to the direction for adjusting the output voltage; and adjusting the output voltage by performing the above steps once or repeatedly, so that the output voltage is equal to the voltage of one LED load which has the highest voltage or the output voltage has a difference within a predetermined range as compared to the voltage of one LED load which has the highest voltage.

It should be noted that, the step may be fixed or variable.

It should be noted that the characteristic parameter can be any parameter which is a representative of the output of the output voltage adjustable circuit, such as output current or output impedance. Preferably, the output characteristic parameter is the output current.

It should be noted that determining the direction for adjusting the output voltage of the output voltage adjustable circuit according to the variation relationship between the characteristic parameter sampled signal and the output voltage includes:

(1) increasing, by the output voltage adjustable circuit, the output voltage of the output voltage adjustable circuit at a set step on the basis of the previous output voltage, detecting the change in the output current; and determining the direction for adjusting the output voltage as increasing the output voltage if the output current is increased as the output voltage is increased; determining the direction for adjusting the output voltage as decreasing the output voltage if the output current remains unchanged while the output voltage is increased;

(2) decreasing, by the output voltage adjustable circuit, the output voltage of the output voltage adjustable circuit at a set step on the basis of the previous output voltage, detecting the change in the output current and determining the direction for adjusting the output voltage as decreasing the output voltage if the output current remains unchanged while the output voltage is decreased, or determining the direction for adjusting the output voltage as increasing the output voltage if the output current is decreased as the output voltage is decreased.

Figure 5:
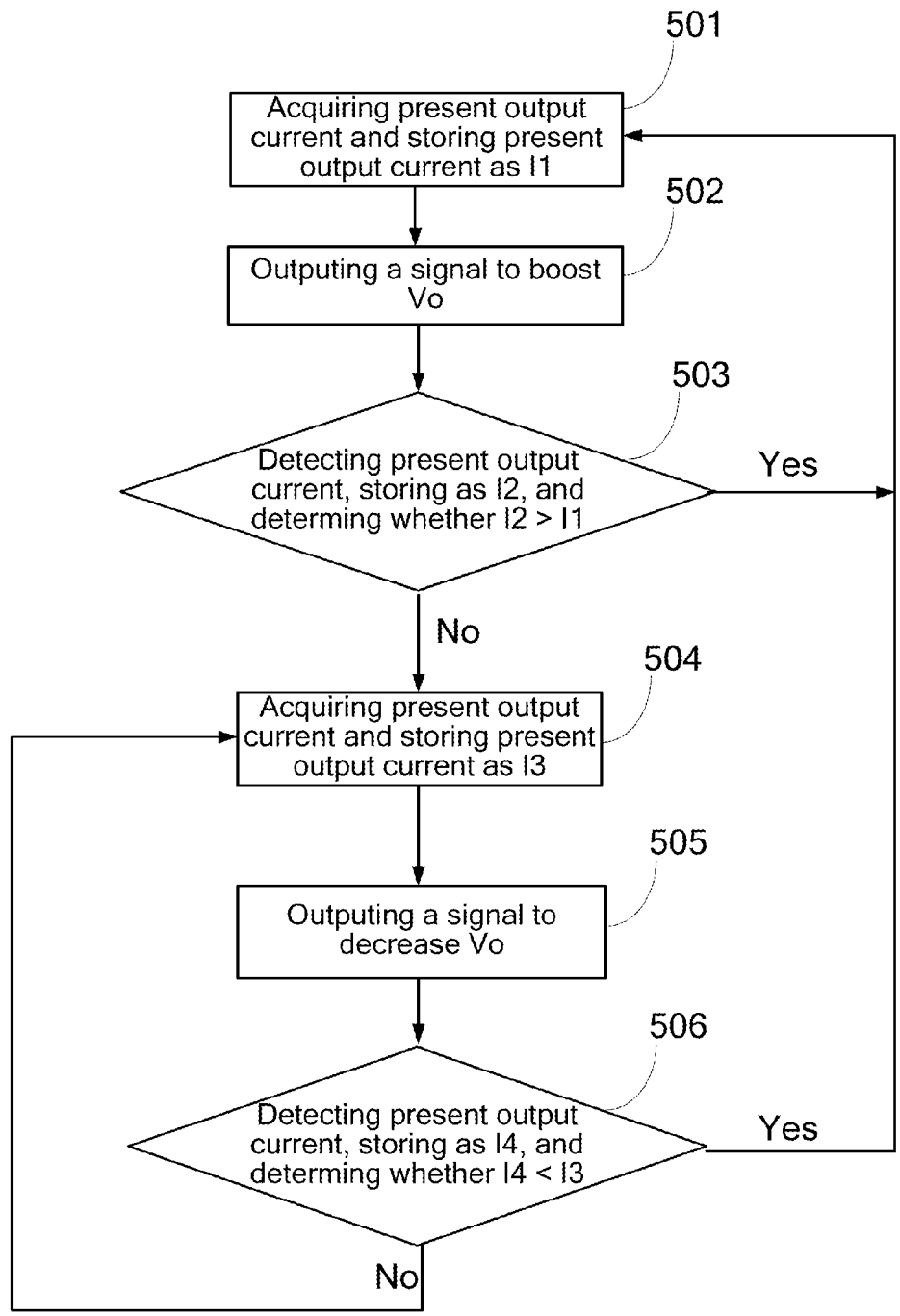
FIG. 5 is a flowchart of an output voltage adjustable method according to an embodiment of the invention.

FIG. 5 is a specific flowchart of the output voltage adjustable method according to the embodiment of the invention, which includes steps of:

Step 501, sampling, by an output current sampling circuit 302, the present output current signal, and inputting the sampled output current signal into an output voltage controller 303; storing, by the output voltage controller 303, the state of the sampled current signal as I1, i.e. the output current of the output voltage adjustable circuit 300 at the present is I1;

Step 502, outputting, by the output voltage controller 303, a control signal so that the output voltage Vo of the output voltage adjustable circuit 300 is increased at a set step;

Step 503, detecting the present output current I2 of the output voltage adjustable circuit 300, comparing I2 with I1, and performing step 501 if I2>I1 so as to store the present output current I2 of the output voltage adjustable circuit 300 as I1; or performing step 504 if I2=I1;

Step 504, storing the present output current I2 of the output voltage adjustable circuit 300 as I3;

step 505, outputting, by the output voltage controller 303, a control signal so that the output voltage Vo of the output voltage adjustable circuit 300 is decreased at a set step;

Step 506, detecting the present output current I4 of the output voltage adjustable circuit 300 again, and comparing I4 with I3, and performing step 501 if I4<I3 so as to store the present output current I4 of the output voltage adjustable circuit 300 as I1; or performing step 504 if I4=I3.

It should be noted that I1 or I3 actually represents a temporary variable, rather than a specific output current of the output current adjustable circuit 300 at a certain moment.

It should be appreciated by those skilled in the art that all or some of the steps in the implementation of the above flowchart can be performed by hardware under instruction of a program which can be stored in a computer readable storage medium, such as ROM/RAM, disk, optical disk and so on.

It can be seen that in the constant-current LED driving circuit according to the embodiment of the invention, when any LED load is in an open-circuit state, no additional open-circuit protecting or detecting circuit is required for that the output voltage adjustable circuit can automatically adjust the output voltage, so that each of the remaining LED loads that are in a normal-connection state can be driven at a constant current that is equal to or close to the current-limiting point, and at the same time the output voltage of the output voltage adjustable circuit is equal or close to the voltage of the LED load having the highest voltage. In the case that some of the LEDs are in an open-circuit state, when the LEDs are re-connected in a plug-and-play manner, the output voltage adjustable circuit can adjust the output voltage automatically, so that each of the LED loads that are in a normal connection state can be driven at a constant current that is equal to or close to the current-limiting point, and at the same time the output voltage of the output voltage adjustable circuit is equal or close to the voltage of the LED load having the highest voltage.

The embodiments of the invention are described in detail above, and the invention is set forth by referring the specific embodiments. The above description of the embodiments are only for facilitating understanding of the circuits in the invention; Meanwhile, numerous variations can be made to the specific embodiments and the applications by those skilled in the art without departing from the idea of the invention. To sum up, the content of the specification should not be construed as a limit to the invention.

What is claimed is:

1. A constant-current LED driving circuit comprising an output voltage adjustable circuit and at least one LED load, wherein each LED load comprises one or more LEDs and a current-limiting circuit connected in series with the one or more LEDs, the current-limiting circuit is adapted to limit a maximum current in the one or more LEDs connected with the current-limiting circuit, the LED load is connected with the output voltage adjustable circuit via two terminals, and the LED loads are independent from each other;

the output voltage adjustable circuit comprises:
a switch conversion main circuit for connecting a power supply and outputting an adjustable voltage to the at least one LED load;
an output characteristic parameter sampling circuit for sampling an output characteristic parameter of the switch conversion main circuit and outputting a sampled signal of the output characteristic parameter; and
an output voltage controller for adjusting an output voltage of the switch conversion main circuit according to a variation relationship between the sampled signal and the output voltage, wherein adjusting the output voltage of the switch conversion main circuit comprises determining a direction for adjusting the output voltage of the switch conversion main circuit according to a variation in the sampled signal and adjusting the output voltage of the switch conversion main circuit at a preset step, so that finally the output voltage is equal to a voltage of one LED load which has the highest voltage or the output voltage has a difference within a predetermined range as compared to the voltage of the LED load which has the highest voltage.

2. The constant-current LED driving circuit according to claim 1, wherein the output characteristic parameter of the output characteristic parameter sampling circuit comprises at least an output current.

3. The constant-current LED driving circuit according to claim 1, wherein the output characteristic parameter sampling circuit is an output current sampling circuit for sampling a current output from the switch conversion main circuit and outputting a sampled signal of the current.

4. The constant-current LED driving circuit according to claim 1, wherein the output voltage controller is adapted for adjusting the output voltage of the switch conversion main circuit in a digital control manner, according to the sampled signal output from the output characteristic parameter sampling circuit.

5. The constant-current LED driving circuit according to claim 4, wherein adjusting the output voltage of the switch conversion main circuit in a digital control manner by the output voltage controller comprises:
(1) controlling, by the output voltage controller, the output voltage adjustable circuit to increase the output voltage of the output voltage adjustable circuit at a set step on a basis of a previous output voltage;
(2) detecting the output current; performing step (1) if the output current is increased as the output voltage is increased, or performing step (3) if the output current remains unchanged;
(3) controlling, by the output voltage controller, the output voltage adjustable circuit to decrease the output voltage of the output voltage adjustable circuit at a set step on a basis of the previous output voltage; and
(4) detecting the output current; performing step (3) if the output current remains unchanged or performing step (1) if the output current is decreased as the output voltage is decreased.

6. The constant-current LED driving circuit according to claim 1, wherein the current-limiting circuit is a linear regulator circuit.

7. The constant-current LED driving circuit according to claim 6, wherein the current-limiting circuit comprises a current-limiting control circuit, a regulating transistor and a branch load current sampling resistor, wherein the regulating transistor is connected in series with the branch load current sampling resistor via a first terminal and a second terminal of the regulating transistor, and is connected in series with LEDs in the present LED load; and wherein two input terminals of the current-limiting control circuit are connected respectively with two terminals of the branch load current sampling resistor, and an output terminal of the current-limiting control circuit is connected with a third terminal of the regulating transistor.

8. The constant-current LED driving circuit according to claim 7, wherein the regulating transistor operates in a linear state, and the load current is DC current.

9. The constant-current LED driving circuit according to claim 7, wherein the regulating transistor operates in a switch state or a fully turn-on state, and the load current is PWM current or DC current.

10. The constant-current LED driving circuit according to claim 1, wherein the current-limiting circuit is a PWM chopping current-limiting circuit.

11. The constant-current LED driving circuit according to claim 1, wherein the current-limiting circuit is a constant-current diode.

12. The constant-current LED driving circuit according to claim 1, wherein the current-limiting circuit is arranged on a base plate of the LED load of a branch where the current-limiting circuit lies.

13. An output voltage adjustable circuit, comprising:
a switch conversion main circuit for connecting a power supply and outputting an adjustable voltage;
an output characteristic parameter sampling circuit for sampling an output characteristic parameter of the switch conversion main circuit and outputting a sampled signal of the output characteristic parameter; and
an output voltage controller for adjusting an output voltage of the switch conversion main circuit according to a variation relationship between the sampled signal and the output voltage, wherein adjusting the output voltage of the switch conversion main circuit comprises determining a direction for adjusting the output voltage of the switch conversion main circuit according to a variation in the sampled signal and adjusting the output voltage of the switch conversion main circuit at a preset step, so that finally the output voltage is equal to a voltage of a branch which has the highest load voltage in post-stage loads or the output voltage has a difference within a predetermined range as compared to the voltage of the branch which has the highest load voltage in the post-stage loads.

14. The output voltage adjustable circuit according to claim 13, wherein the output characteristic parameter of the output characteristic parameter sampling circuit comprises at least an output current.

15. The output voltage adjustable circuit according to claim 13, wherein the output characteristic parameter sampling circuit is an output current sampling circuit for sampling a current output from the switch conversion main circuit and outputting a sampled signal of the current.

16. The output voltage adjustable circuit according to claim 15, wherein the output voltage controller is adapted for adjusting the output voltage of the switch conversion main circuit in a digital control manner, according to the sampled signal output from the output characteristic parameter sampling circuit.

17. The output voltage adjustable circuit according to claim 16, wherein adjusting the output voltage of the switch conversion main circuit in a digital control manner by the output voltage controller comprises:

(1) controlling, by the output voltage controller, the output voltage adjustable circuit to increase the output voltage of the output voltage adjustable circuit at a set step on a basis of a previous output voltage;

(2) detecting the output current; performing step (1) if the output current is increased as the output voltage is increased, or performing step (3) if the output current remains unchanged;

(3) controlling, by the output voltage controller, the output voltage adjustable circuit to decrease the output voltage of the output voltage adjustable circuit at a set step on a basis of the previous output voltage; and (4) detecting the output current; performing step (3) if the output current remains unchanged, or performing step (1) if the output current is decreased as the output voltage is decreased.

18. An output voltage adjustable method for controlling an output voltage of an output voltage adjustable circuit, wherein the output voltage adjustable circuit needs only two wires to be supplied to one or more LED loads connected in parallel, each LED load comprises one or more LEDs and a current-limiting circuit connected in series with the one or more LEDs, and wherein the method comprises:

determining a direction for adjusting the output voltage of the output voltage adjustable circuit according to a variation relationship between a characteristic parameter sampled signal and the output voltage;

adjusting the output voltage of the output voltage adjustable circuit at a preset step, according to the direction for adjusting the output voltage; and adjusting the output voltage by performing the above steps once or repeatedly, so that the output voltage is equal to a voltage of one LED load which has the highest voltage or the output voltage has a difference within a predetermined range as compared to the voltage of one LED load which has the highest voltage.

19. The output voltage adjustable method according to claim 18, wherein the output characteristic parameter comprises at least an output current.

20. The output voltage adjustable method according to claim 18, wherein determining the direction for adjusting the output voltage of the output voltage adjustable circuit according to the variation relationship between the characteristic parameter sampled signal and the output voltage comprises:

(1) increasing, by the output voltage adjustable circuit, the output voltage of the output voltage adjustable circuit at a set step on a basis of a previous output voltage, detecting a change in the output current, and determining the direction for adjusting the output voltage as increasing the output voltage if the output current is increased as the output voltage is increased, or determining the direction for adjusting the output voltage as decreasing the output voltage if the output current remains unchanged while the output voltage is increased; and (2) decreasing, by the output voltage adjustable circuit, the output voltage of the output voltage adjustable circuit at a set step on a basis of the previous output voltage, detecting the change in the output current, and determining the direction for adjusting the output voltage as decreasing the output voltage if the output current remains unchanged while the output voltage is decreased, or determining the direction for adjusting the output voltage as increasing the output voltage if the output current is decreased as the output voltage is decreased.

* * * * *